United States Patent

Liberman

[15] 3,679,837

[45] July 25, 1972

[54] INTERCOMMUNICATION SYSTEM

[72] Inventor: Zvie Liberman, c/o Talk-A-Phone Company, 5013 N. Kedzie Ave., Chicago, Ill. 60625

[22] Filed: May 8, 1969

[21] Appl. No.: 823,009

[52] U.S. Cl. ........ 179/37

[51] Int. Cl. ........ H04m 9/00

[58] Field of Search ........ 179/1.4, 37–40, 179/1 HF

[56] References Cited

UNITED STATES PATENTS

| | | | |
|---|---|---|---|
| 2,958,730 | 11/1960 | Myers | 179/1 |
| 3,030,446 | 4/1962 | Briggs | 179/1 |
| 3,215,780 | 11/1965 | Beszedics et al. | 179/1 |
| 3,215,781 | 11/1965 | Yong | 179/1 |
| 3,321,580 | 5/1967 | Horne et al. | 179/1 |
| 3,499,115 | 3/1970 | Santag | 179/1 |
| 3,041,411 | 6/1962 | Beatty | 179/1 HF |
| 3,189,691 | 6/1965 | Simpson | 179/1 UC |
| 3,243,512 | 3/1966 | Herman | 179/1 H |

*Primary Examiner*—Kathleen H. Claffy
*Assistant Examiner*—William A. Helvestine
*Attorney*—Hofgren, Wegner, Allen, Stellman & McCord

[57] ABSTRACT

An intercommunication system with multiple stations using a balanced two-wire connection between stations. The connections float when not in use and are connected with a reference potential when in use. The stations have sensing means which respond to the condition of the connections and control the operation during initiation or reception of a call.

3 Claims, 3 Drawing Figures

INVENTOR
Zvie Liberman
BY Hofgren, Wegner, Allen, Stellman & McCord
ATTORNEYS

PATENTED JUL 25 1972

3,679,837

SHEET 2 OF 2

INTERCOMMUNICATION SYSTEM

This invention relates to a multiple station intercommunication system with signal carrying circuits connected between stations. More particularly, the invention is concerned with an operating control used during initiation of a call to determine whether the called station is busy, to signal the call station and to perform other functions.

In a simple intercommunication system if a call is made to a station which is busy, there is interference between the messages. There are systems known which provide circuitry for determining whether the called station is busy. See for example Liberman U.S. Pat. No. 3,023,273 which utilizes current sensitive relays to determine whether a circuit is in use. The system of this patent is both expensive to manufacture and difficult to keep in proper adjustment. In the system of Liberman U.S. Pat. No. 3,243,512 a busy indication is provided, but it is required that the stations be kept in a standby condition when not in use. This adds to the complexity of the operation.

A principal object of this invention is to provide a control system which is relatively inexpensive to manufacture and does not require adjustment or present maintenance problems. More particularly, it is an object of this invention to provide a control system which is dependent on an electrical condition of a circuit interconnecting the stations, as the signal carrying circuits, and which utilizes sensing means that are responsive to the circuit conditions to give signals, complete call connections and perform other functions.

One feature of the invention is that the control includes means which establishes in the signal carrying circuits a first electrical condition when the circuit is free and a second electrical condition when the circuit is in use. In a call originating station, means sense the electrical condition of the signal carrying circuit connected with an intended call receiving station and the control includes means responsive to the sensing means to complete the call connection if the circuit is free. Conversely, if the circuit is in use, a signal so indicating is provided at the call originating station.

Another feature is that the control includes a means responsive to a sensing means to give a signal of the intended call at the receiving station.

A further feature is that the call originating station includes an amplifier and the control has means responsive to the sensing means for rendering the amplifier operative if the signal carrying circuit is free.

Yet another feature is that the signal carrying circuits are two-wire balanced lines having a first electrical condition in which they float when free and a second electrical condition connected with a reference potential means when in use. In the specific embodiment of the invention illustrated, a switch responsive to the sensing means connects the line to be used with the reference potential means.

Still a further feature is the provision of means in an intended call receiving station for sensing the electrical condition of the signal carrying circuit connected with a call originating station, together with means responsive to the electrical condition to provide an indication of the incoming call.

And another feature is that the control includes means responsive to use of the intended call receiving station to inhibit operation of the incoming call sensing means.

Further features and advantages of the invention will readily be apparent from the following specification and from the drawings, in which.

Figure 1:
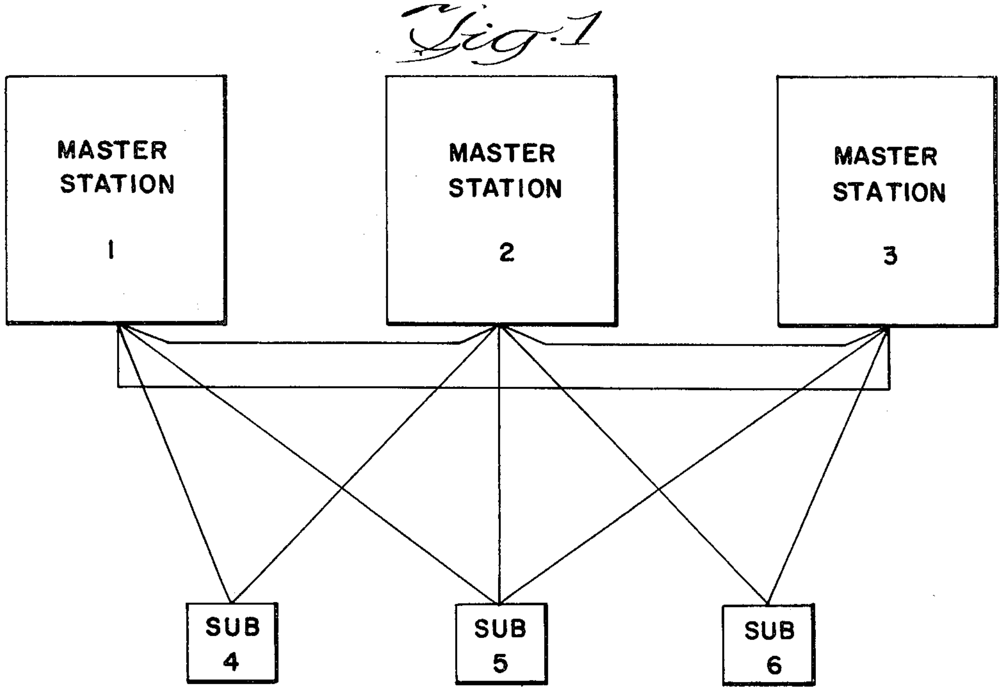
FIG. 1 is a block diagram of an intercommunication system showing the cable connections between stations.

A portion of a typical intercommunication system is illustrated in FIG. 1. Master stations numbered 1, 2 and 3 are connected with substations 4, 5 and 6. Suitable signal transmission circuits are connected between the various stations. These may, for example, be two-wire lines which are balanced with respect to a reference potential or ground. In general, each of the master stations is interconnected with each of the other master stations while the substations may be connected with one or more of the master stations. Here, substation 4 is shown connected with master stations 1 and 2, substation 5 with all three master stations and substation 6 with master stations 2 and 3. In some cases a single pair of wires is sufficient between stations while in other cases two or more pairs are provided depending on the functions which are incorporated in the system.

A master station can initiate a call to another master station or to a substation. In addition, a master can listen to the conversation at another master station unless the other master station is connected for private operation. If a substation is connected to a master station by two conductor pairs, it can initiate a call to the master station. If only a single connection is provided, a call cannot be initiated. More sophisticated systems are known, but the foregoing provides sufficient background information for an understanding of the invention.

Figure 2:
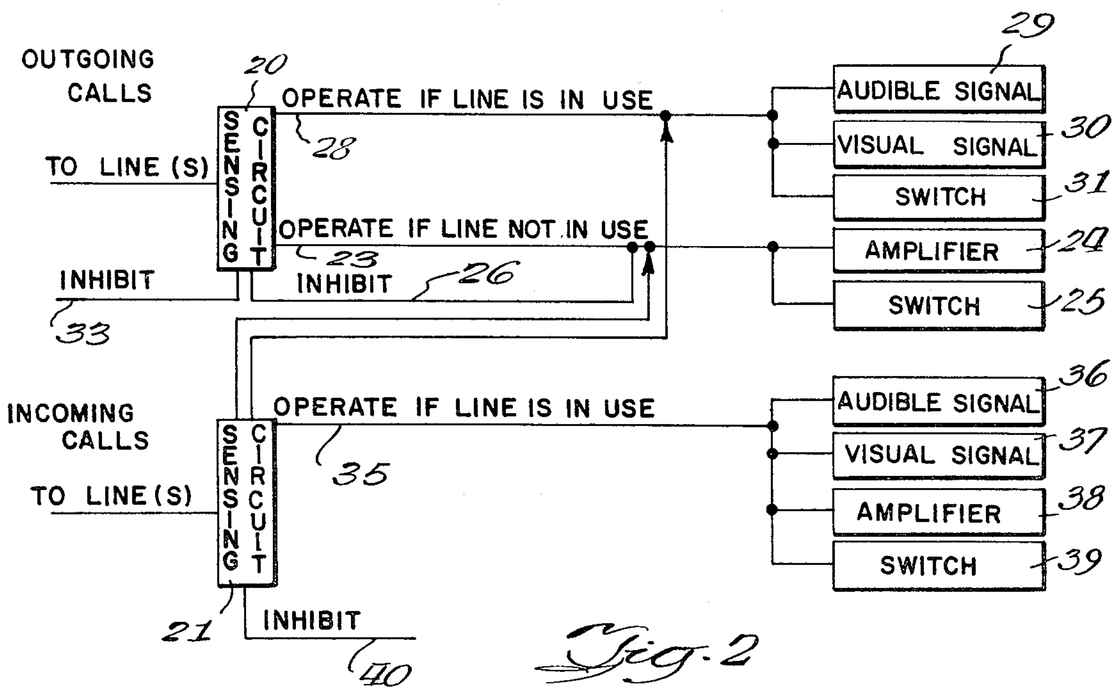
FIG. 2 is a diagrammatic sketch illustrating the operation of the control system.

With these general comments concerning the interconnection of the stations, consideration will be given to the diagrammatic illustration of the control circuits of FIG. 2. In accordance with the invention, an electrical condition of the signal carrying circuit used between stations is dependent on whether or not the station to which the circuit is connected is in use. For example, in the specific system to be described, the balanced two-wire line floats when the station is not in use and is grounded when it is in use.

A typical master station is provided with two sensing circuits 20, 21. As indicated by the legends in FIG. 2, sensing circuit 20 determines the condition of the line connected with the station to which an outgoing call is to be made and performs certain functions. Sensing circuit 21 is concerned with the condition of an incoming line and likewise performs certain functions.

When a call is initiated from one station to another, sensing circuit 20 is utilized. Initially a connection is made between the sensing circuit and the signal transmission line connected to the station for which a call is intended. If the line is not in use, the connections for the call may be completed. When the sensing circuit makes this determination an output signal so indicating is provided at 23 which performs such functions as energizing an amplifier 24 or actuating a switch 25. Since the completion of the connection to the line to make the call changes the line from one which is not in use to one which is in use, an output of sensing circuit 20 at 23 is coupled back to the sensing circuit through the inhibit connection 26 to prevent the sensing circuit from changing its condition when the connections for the call are completed.

In the event the line to the station for which a call is desired is in use, an output is derived from the sensing circuit 20 at 28. This performs a variety of desired functions such as sounding an audible signal 29, actuating a visual signal 30 or operating a switch 31 to operate some other device.

If other conditions in the system make it undesirable for a call to be initiated, an inhibit input to sensing circuit 20 on line 33 prevents its operation.

Sensing circuit 21 for incoming calls is connected with the lines bringing into the station calls from other stations. When a call is received, the electrical condition of the incoming line changes and an output is derived from the sensing circuit at 35. This output may be utilized to sound an audible signal 36, or operate a visual signal 37. Further more, the output may turn on an amplifier 38 or control a switch 39 to perform some other function. The output of sensing circuit 21 may be coupled to the outputs 23, 28 of sensing circuit 20 so that the various signals and switches serve a dual function. An inhibit input at 40 renders the sensing circuit inoperative.

Figure 3:
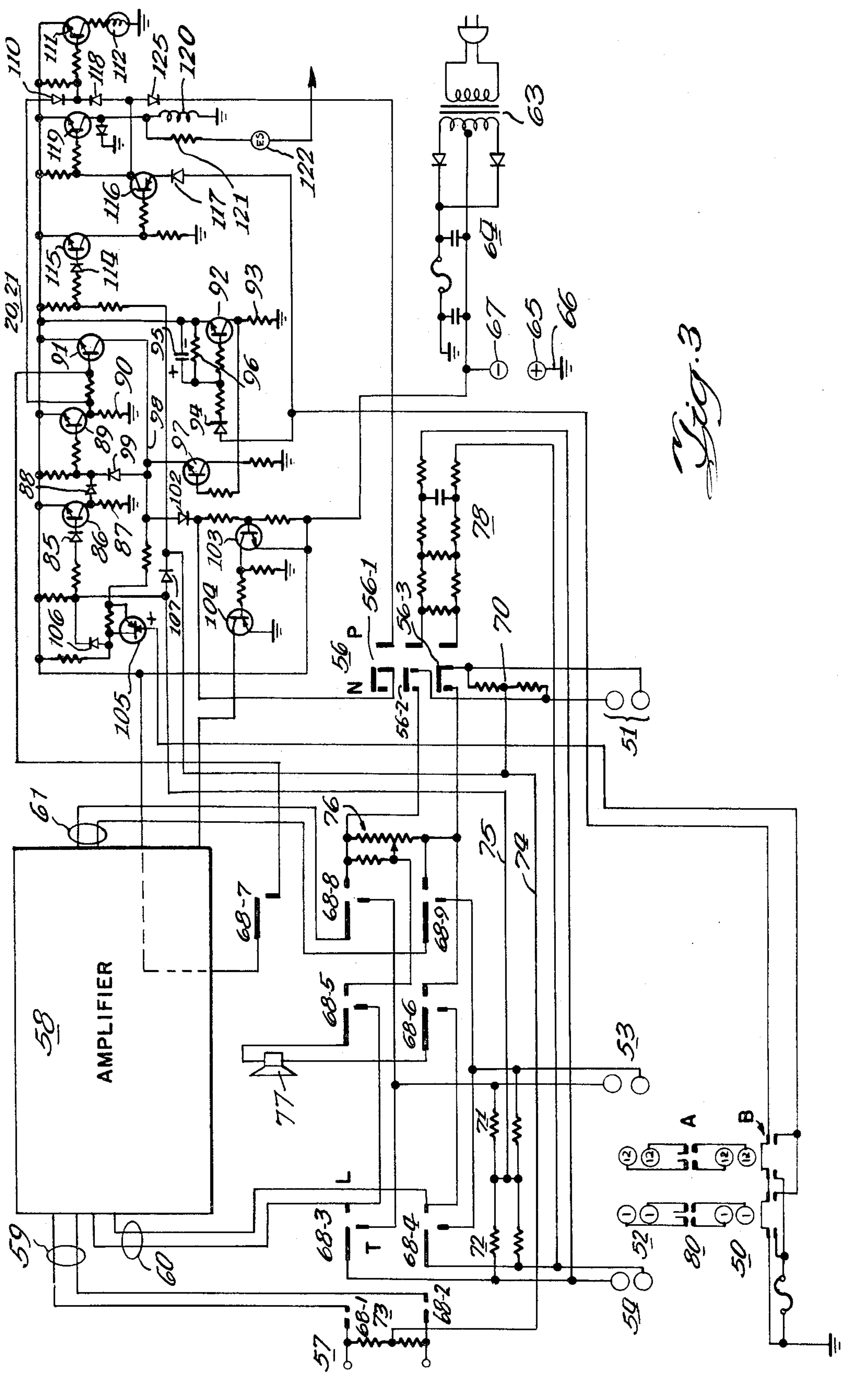
FIG. 3 is a schematic diagram of a master station incorporating the invention.

The circuitry of a master station is illustrated in FIG. 3. The circuitry of a substation is much simpler and may be of the type shown in FIG. 6 of Liberman U.S. Pat. No. 3,130,272.

The master station circuits are interconnected with other stations through two-wire pairs connected with appropriate terminals. More particularly, there are shown a series of terminal pairs 50 identified as 1 . . . 12 to which are connected the two-wire pairs for outgoing calls to other stations. The number of terminal pairs, here 12 (only 1 and 12 are shown), is determined by the capacity of the station. Incoming lines from other master stations are connected with terminal pair 51.

Inside the station, the lines going to other master stations are connected for private or non-private operation by connections between terminal pairs 52 (1 . . . 12) and terminal pair 53 (private) or 54 (non-private). The relationship of the master station of FIG. 3 to other master stations is determined by the setting of three sections switch 56 in either the N (non-private) or P (private) position.

Terminal pair 57 provides for connection of incoming calls from substations.

An amplifier 58 has two input circuits, 59 and 60, and an output circuit 61. The detailed circuitry of the amplifier is not part of the invention and is not shown.

The station circuits are powered from a suitable source, as 60 cycles AC, connected through transformer 63 with a full wave rectifier and filter 64. The positive terminal 65 of the power supply is returned to a reference potential or ground 66 and the negative terminal 67 has various circuits connected thereto.

The two-wire pairs connected between the stations operate in a balanced condition with respect to ground 66. Resistor pairs 70, 71, 72 and 73 are connected across terminal pairs 51, 53, 54 and 57, respectively. The center points of resistor pairs 70 and 73 are connected together at 74 and the center point of resistor pairs 71 and 72 are connected together at 75, these center points in turn being connected with the line condition sensing and control circuitry 20, 21.

Before considering the line sensing and control circuitry in detail, the general operation of the master station circuitry will be described. The operation is controlled by a nine-section, two-position talk-listen switch 68, shown in the listen (L) position. (This is to be contrasted with the three-position switch of U.S. Pat. No. 3,243,512.) Each section of the switch is designated by reference numeral 68, followed by a number 1 through 9 and the contacts of the section are indicated by T or L, as 68–1–L.

In the listen position without a station selected for an outgoing call, amplifier 58 is not energized, as will appear. Incoming calls may be received from other master stations and a response made without operating talk-listen switch 68 if switch 56 is in the non-private (N) position. In this situation an incoming signal at terminal pair 51 is connected through switch section 56–2 and 56–3, volume control 76, and contacts 68–5–L, 68–6–L with transducer 77, a combined speaker-microphone. The response goes directly to the other station. If switch 56 is in the private (P) position, incoming signals at terminals 51 are connected through attenuator 78 and switch contacts 68–3–L, 68–4–L to amplifier input 60. To respond, the appropriate station selector switch 80 (1 . . . 12) is operated and talk-listen switch 68 is operated to the talk (T) position. Transducer 77 is connected through contacts 68–5–T, 68–6–T with amplifier input 60. The amplifier output is connected through contacts 68–8–T, 68–9–T with terminals 53 and further through contacts 68–3–T, 68–4–T with terminals 54. Incoming calls from substations, appearing at terminals 57, are connected through contacts 68–1–L, 68–2–L to amplifier input 59.

To initiate a call, the operator actuates the appropriate station selector switch 80, there being one for each of the station terminals 1–12. Each of the station selector switches has a section A which connects the external and internal terminals, as 50–1 and 52–1 to connect the two-wire cable with talk-listen switch 68. Each of the station switches 80 also has a section B with a closed upper section and an open lower section in the unactuated or normal switch position which provides additional control functions, as will appear. With a station selected and the amplifier energized, the operation is as follows: When talk-listen switch 68 is operated to the talk position, microphone 77 is connected through contact 68–5–T, 68–6–T with input 60 of amplifier 58. The output of the amplifier is connected from the output circuit 61 through contacts 68–8–T, 68–9–T to private terminals 53 and through additional contacts 68–3–T, 68–4–T with non-private terminals 54. Thus the output of the amplifier is coupled to the appropriate pair of terminals 50. With switch 68 in the listen position, incoming signals from substations are connected with the amplifier input or speaker 77, as described above. The conversation is carried out with the operator at the call originating station manipulating his talk-listen switch 68 between the talk and listen position.

The sensing and control circuits 20, 21 will now be described. When a pair of wires is busy, the center point, as point 74 or 75, has a positive potential, i.e., ground. When the pair of wires is not in use, the center point is floating. The center point may in other forms of the invention be connected with a fixed voltage source, different from the voltage during use. The sensing and control circuitry responds to the level of the two-wire pairs to perform the desired functions.

Consider first a situation upon initiation of a call to another station. If the called station is free, point 75 at the center of terminating resistors 71, 72 is floating. This point is connected through diode 85 with the base of transistor 86, the emitter-collector circuit of which is connected from the negative terminal 67 to ground 66. When the base floats, transistor 86 does not conduct. Accordingly, the voltage at the collector, which is connected through resistor 87 with ground, is positive. This positive voltage is applied through diode 88 to the base of transistor 89, which also has an emitter-collector circuit connected from the negative terminal to ground, causing it to conduct. Accordingly, the collector is substantially at the negative source potential as a result of the voltage drop across emitter resistor 90 and this negative potential is applied to the base of transistor 91. At the time of selecting a station, the collector of transistor 91 is not connected with the power source. However, after a short time delay, which permits the condition of transistors 86 and 89 to stabilize, this connection is completed. With the called station free, the negative potential on the base of transistor 91 prevents it from conducting.

The time delay circuitry utilizes transistor 92 having an emitter-collector circuit connected from the negative terminal to ground through collector resistor 93. Prior to station selection, selector switch 80–B (1 . . . 12) upper section for each of the stations is closed. These switch sections are connected in series from the base of transistor 92 to ground. Accordingly, a positive potential is applied through diode 94 to the base of the transistor rendering it conductive. A capacitor 95, connected from the base of transistor 92 to the negative source is charged with the indicated polarity. Upon selection of a station, the corresponding switch contact 80–B (upper section) is opened breaking the positive supply connection for the base of transistor 92. The charge on capacitor 95 maintains the transistor 92 conductive as the capacitor discharges through shunt resistor 96. After a time period dependent on the time constant of the circuit, transistor 92 turns off. So long as transistor 92 conducts, the voltage at the collector is negative. This voltage is applied to base of transistor 97, the emitter-collector circuit of which is connected in series with the emitter-collector circuit of transistor 91. So long as transistor 92 conducts, this negative potential prevents conduction of transistor 97. However, after the expiration of the time delay, transistor 97 conducts connecting the collector of transistor 91 to ground.

With point 75 floating (or negative) transistor 91 does not conduct, the point 98 becomes positive. This has several effects. First, the positive potential is applied through diode 99 to the base of transistor 89, locking it in a conductive condition. Second, a positive potential is applied through diode 102 to the base of transistor 103, causing it to conduct and in turn causing transistor 104 to conduct. This completes a circuit in amplifier 58, rendering it operative.

The positive potential at 98 is applied to the gate electrode of a silicon controlled rectifier 105 causing the rectifier to fire. This completes a circuit from the positive ground 66 through the lower section of contacts of switch 80–B (1 . . . 12) for the selected station, the SCR and diode 106 to apply a positive potential to the center point 75 of line terminating resistors 71, 72. This establishes the in-use condition of the line to activate circuits in the called station and to indicate to a subsequent caller that the line is in use. A positive potential is also applied through diode 107 to resistor midpoint 74 so that if another station attempts to call the master which is initiating this call, it will determine that the station is in use.

If the called station was already busy, the center point of the receiving terminals (as terminal pair 51) at that station is already at a positive or ground potential. This positive potential is transmitted through the two-wire line and station selector switch 80–A to the call initiating station and appears at 75. The positive potential is applied through diode 85 to the base of transistor 86 turning it on. The collector of transistor 86 is essentially at the negative source potential and diode 88 does not conduct. Transistor 89 is cut off by the negative potential applied to the base. As there is no current flow through collector resistor 90, transistor 91 has a positive potential at the base and, when the time delay is completed and transistor 97 conducts, transistor 91 is rendered conductive. This clamps point 98 at the negative power line potential and prevents energization of the amplifier 58.

The positive potential at the collector of transistor 89 is applied through diode 110 to the base of transistor 111, causing it to conduct and energize signal lamp 112, indicating that the called station is busy. Other indicators could be added.

When a call is received from another station, and the receiving station is not busy so that it may accept a call, the positive reference voltage of the two-wire incoming line from the calling station appears at 74. It will be recalled that the incoming lines from master stations are connected to terminals 51 while incoming calls from substation are connected with the terminal pair 57. The positive potential on the line from the calling station is established in a manner comparable with that by which the potential applied to line 75 through SCR 105 is established, FIG. 3.

The positive potential on line 74 is applied through diode 114 to the base of transistor 115 turning it on and causing the collector to go to a negative potential. This negative potential is applied to the base of transistor 116, turning it on if the circuit of the emitter is completed. This circuit includes diode 117 and the series connected, normally closed upper sections of station selector switch 80–B. So long as none of the station selector switches in the call receiving station is actuated, this circuit is completed. However, if a call is being made, the call receiving circuitry is inhibited.

When transistor 116 conducts upon reception of a call, the collector becomes positive. This positive potential is coupled through diode 118 to the base of transistor 111, turning it on and energizing lamp 112 which indicates to the operator that a call is being received. Connected in parallel with the lamp circuit is transistor 119 which is also rendered conductive on receipt of a call. This energizes a chime 120 in the collector circuit and, through isolating resistor 121, applies a negative potential to terminal 122, to which may be connected an external signal device.

A positive potential from the collector of transistor 116 is also connected through diode 125 and selector switch 56–1, if in the private (p) position, to the base of transistor 103, turning on transistors 103, 104 and completing the circuit for amplifier 58.

If the station is in use at the time a call is received, there is a positive potential at 74 from SCR 105, as described above (or from a comparable circuit in the station with which the unit is in communication). This positive potential is sensed by the call originating station and results in the establishment of a busy signal at that station. If the unit of FIG. 3 has initiated the prior call, station selector switch 80 will be actuated and one of the upper sections of 80–B will be open, breaking the emitter power circuit for transistor 116. Thus, the lamp 112 is not energized. If the previous call was initiated by another master station so that selector switch 80 was not actuated, lamp 112 is already on.

When a call is received by a station having switch 56 in the private (P) position, the operator at that station must actuate the station selector switch 80 corresponding with the calling station and operate the talk-listen switch 68 in order to respond. When the station selector switch makes a connection with the calling station, the calling station is in use and a positive potential is present at 75. This establishes a busy condition. However, when the talk-listen switch is actuated, contact 68–7–T is closed applying a negative potential to the base of transistor 91, turning it off.

The substation circuitry, as pointed out above, may be much simpler. However, those portions of the sensing and control circuitry 20, 21 relating to determining the condition of a line, signaling and grounding a line may be used.

I Claim:

1. In an intercommunication system having plural stations which may originate or receive calls, with circuits connected between stations, an operating control, comprising:
   - means for establishing in said circuits a first electrical condition when the circuit is free and a second electrical condition when said circuit is in use;
   - means in a call originating station for sensing the electrical condition of the circuit connected with an intended call receiving station;
   - an amplifier in the call originating station;
   - means responsive to said sensing means for rendering said amplifier operative and completing the call connection if said circuit is free;
   - means responsive to said sensing means for maintaining said amplifier in an inoperative state if said circuit is in use; and
   - means for manually overriding said maintaining means to render said amplifier operative for transmission of a message to the intended call receiving station.

2. In an intercommunication system having plural stations which may originate or receive calls through two-wire balanced lines connected between stations, an operating control comprising:
   - means for establishing in said lines a first electrical condition in which they float when free and a second electrical condition in which they are connected with a reference potential means when in use;
   - means in a call originating station for sensing the electrical condition of the lines connected with an intended call receiving station;
   - means responsive to said sensing means for completing the call connection if said lines are free;
   - a semiconductor switch responsive to said sensing means to connect said two-wire balanced lines with said reference potential means upon completion of the call connection; and
   - a station selector switch with a section in series with said semiconductor switch, said switch section being operated to open condition upon termination of the call to interrupt the circuit of said semiconductor switch.

3. In an intercommunication system having plural stations which may originate or receive calls, with circuits connected between stations, an operating control, comprising:
   - means for establishing in said circuits a first electrical condition when the circuit is free and a second electrical condition when said circuit is in use;
   - means in a call originating station for sensing the electrical condition of the circuit connected with an intended call receiving station;
   - an amplifier at the call originating station, the operation of which is necessary to complete a call connection; and
   - means responsive to said sensing means for rendering said amplifier operative at the end of said time delay if said circuit is free, and maintaining said amplifier inoperative if said circuit is in use including an amplifier control circuit having an input, and an output coupled to said amplifier, said control circuit respectively rendering said amplifier inoperative and operative when its input is in first and second electrical states, a first transistor for switching said control circuit input to said first state in response to a signal at its base when enabled, a second transistor for providing said signal in response to said station connecting circuit being in said first electrical condition, said second transistor only providing said signal when not disabled, and a third transistor associated with said time delay means and coupled to the control circuit input and said first and second transistors, said third transistor changing states, at the end of said time delay to enable said first transistor to switch said control circuit input to said first state, if said signal is being provided, and switching said input to said second state at the end of said time delay and disabling said second transistor, if said signal is not being provided.

* * * * *